United States Patent
Erlandsson et al.

(10) Patent No.: US 9,423,940 B2
(45) Date of Patent: Aug. 23, 2016

(54) DYNAMIC ANNOTATION IN USER INFORMATION SYSTEM OF IR CAMERA

(71) Applicant: FLIR Systems AB, Taby (SE)

(72) Inventors: Mikael Erlandsson, Uppsala (SE); Erland George-Svahn, Solna (SE); Torsten Sandbäck, Stockholm (SE)

(73) Assignee: FLIR SYSTEMS AB, Taby (SE)

( * ) Notice: Subject to any disclaimer, the term of this patent is extended or adjusted under 35 U.S.C. 154(b) by 339 days.

(21) Appl. No.: 13/952,557

(22) Filed: Jul. 26, 2013

(65) Prior Publication Data

US 2014/0013201 A1 Jan. 9, 2014

Related U.S. Application Data (63) Continuation-in-part of application No. PCT/EP2012/051389, filed on Jan. 27, 2012.

(60) Provisional application No. 61/437,266, filed on Jan. 28, 2011.

(51) Int. Cl.
*G06F 17/00* (2006.01)
*G06F 3/0484* (2013.01)
*G06F 17/30* (2006.01)
*G06F 17/24* (2006.01)

(52) U.S. Cl.
CPC ..... *G06F 3/04845* (2013.01); *G06F 17/30265* (2013.01); *G06F 17/241* (2013.01); *G06F 17/30044* (2013.01); *G06F 17/30047* (2013.01); *G06F 17/30247* (2013.01); *G06F 17/30256* (2013.01); *G06F 17/30268* (2013.01); *G06F 17/30274* (2013.01)

(58) Field of Classification Search
CPC ............... G06F 3/04845; G06F 17/30265; G06F 17/30256; G06F 17/30268; G06F 17/30044; G06F 17/30047; G06F 17/30274; G06F 17/30247; G06F 17/241; G06F 3/0484; G06F 3/002; G06F 3/01
USPC ....... 715/230–233, 756, 700, 972, 253, 975, 715/229
See application file for complete search history.

(56) References Cited

U.S. PATENT DOCUMENTS

| | | | |
|---|---|---|---|
| 5,637,871 A | 6/1997 | Piety et al. | |
| 2011/0074959 A1* | 3/2011 | Strandemar | G01J 5/025 348/164 |
| 2012/0224067 A1* | 9/2012 | Stuart | G06F 17/30265 348/164 |

* cited by examiner

*Primary Examiner* — Quoc A Tran
(74) *Attorney, Agent, or Firm* — Haynes and Boone, LLP (57) ABSTRACT

The present invention relates in general to the field of applications and functions of an IR-camera device operated by a user in connection with the recording of IR images and to processing of IR images on a computer application program. A system for managing annotations to IR images comprising selectable annotation input functions that are actuatable by means of control commands displayed on the display is disclosed.

11 Claims, 4 Drawing Sheets

DYNAMIC ANNOTATION IN USER INFORMATION SYSTEM OF IR CAMERA

CROSS-REFERENCE TO RELATED APPLICATIONS

This application is a continuation-in-part of International Patent Application No. PCT/EP2012/051389 filed Jan. 27, 2012 and entitled "DYNAMIC ANNOTATION IN USER INFORMATION SYSTEM OF IR CAMERA", which is incorporated herein by reference in its entirety.

International Patent Application No. PCT/EP2012/051389 claims the benefit of U.S. Provisional Patent Application No. 61/437,266 filed Jan. 28, 2011, which is hereby incorporated by reference in its entirety.

TECHNICAL FIELD

The present invention relates in general to the field of IR imaging, and more specifically to systems and methods for user interface functionality enabling a user to operate annotations associated with an IR image.

BACKGROUND

IR cameras are used as tools within different industries and services. The IR cameras are used for measuring the temperature of different objects or sites. As IR cameras are getting more widespread, the needs of IR camera users have come more in focus. Users of IR cameras have a need for keeping record of, for example, notes and observations taken in the course of capturing IR images. Such notes may for example concern circumstances, observations of facts or deviations from expected results of thermography inspections or thermographic measurements. Today, it is common to take notes on paper to make a preliminary documentation of observations or deviation reports. The notes are then usually transferred to a digital format by manual input to a computer application program that couples the notes to the corresponding IR images. These kind of notes coupled to images are commonly called annotations.

The IR camera devices on the market today have the ability to let the user enter predetermined types of data into the camera via a text input function in the IR camera itself or via an application program running on a computer. This possibility to enter data of a predetermined data type into the IR camera using the text input function on the camera facilitates for the user to make annotations to images. However, the input functions for entering annotations that are known today require that the user in advance has determined and created a predetermined structure of input fields and also predetermined the possible type, content and values that are allowed to be input in each field.

There is a need for a more flexible and user friendly input interface for entering annotations, an input interface that can be adapted by the user and also adjusted according to the needs of the user in a more flexible manner compared to the input functions present in the IR cameras and IR image application programs known today.

SUMMARY

Various embodiments of the disclosure are therefore directed to applications and functions of an IR-camera device operated by a user in connection with the recording of IR images with an IR camera and to the processing of IR images on a computer application program configured for IR image processing. Various embodiments of systems and methods are disclosed herein for user interface functionality enabling a user to operate annotations associated to an IR image in a dynamic fashion.

According to various embodiments of the disclosure, systems and methods enable a user to change the structure of annotation input, such as annotation input fields, for example by adding or deleting input fields. Automatic and seamless association and synchronization between an annotation functionality system executed on a camera and an annotation functionality system running in conjunction with an IR image processing system on a computing device ensure that the user always has access to the most recent information. Various embodiments of the systems and methods disclosed herein further enable and support efficient annotation for example by providing intelligent data handling, annotation data structures, input functions and re-use of data.

Further features, effects and advantages of embodiments of the disclosure include, for example: enabling dynamically entering of annotations as additional information or data associated with an IR image in the operation of an IR camera; enabling a user to change the setup of the functions of an IR-camera in real-time, when the need of the user occurs, for example adding and removing functions or substructures for annotation; storing data and new input fields or annotation structures entered into the camera; visualizing annotation data previously entered for example in the camera to facilitate for the user; enabling intelligent input fields and presettable default input fields; automatically synchronizing and/or transferring annotation data or annotation structures between a camera and a computer such that the most recent data always is present in the computer and in the camera; enabling annotation data or a part of an annotation data set is connected or associated automatically to a special place, object, site or application type.

BRIEF DESCRIPTION OF DRAWINGS

Embodiments of the disclosure are further explained by reference to the accompanying drawings, in which.

Embodiments of the disclosure and their advantages are best understood by referring to the detailed description that follows.

DETAILED DESCRIPTION

Introduction

When a user works with IR images captured in the course of thermography inspections or thermography measurement, he usually makes annotations to the images regarding information such as circumstances in the measurement, environmental information, information about the inspected and for that purpose imaged object or imaged object scene, or information about deviations from an expected result or situation. It is a natural behavior for the user to enter and store such annotations to a data collection associated with the IR image via a graphical user interface coupled to an image display functionality comprising image display software controlling the presentation of an IR image on a display. Some annotations may also be entered automatically or semi-automatically for example from sensors, positioning systems or other technical annotation sources. The user may work with the IR images and enter the annotations by means of annotation functionality in an IR camera, generally called an IR imaging device, or in a general computing device provided with an IR image processing application comprising software program code devised for presenting and processing IR images.

User Controllable Annotation Data Structure

According to embodiments of the invention, a user controllable annotation functionality is provided that enables a user to adapt the structure and content of annotations that are accepted to input and store. The controllable annotations functionality is in various example embodiments of the invention, and embodied as an annotations functionality in the form of a user information input system for an IR camera or an IR image processing application, the input system comprising different input functions that are actuatable by means of control commands displayed on a display of the IR camera or the IR image processing application. Such an input function may be activated, added, deleted or changed in real time in response to a control command from the user. The input functions are in different embodiments text input fields, calculator programs or statistical calculation programs useful for handling data in IR images from measurements by IR camera devices.

Various embodiments of the disclosure thus provide a flexible and user friendly annotation functionality, for example with user definable function fields in IR cameras and IR image processing applications, which can be adapted by the user and also adjusted according to the needs of the user. In contrast to the case with prior art indicated in the background, the users do not need to work on preparing input fields in advance and can instead build the structures and substructures required at the time they need it.

Annotations Functionality System Architecture

Figure 2:
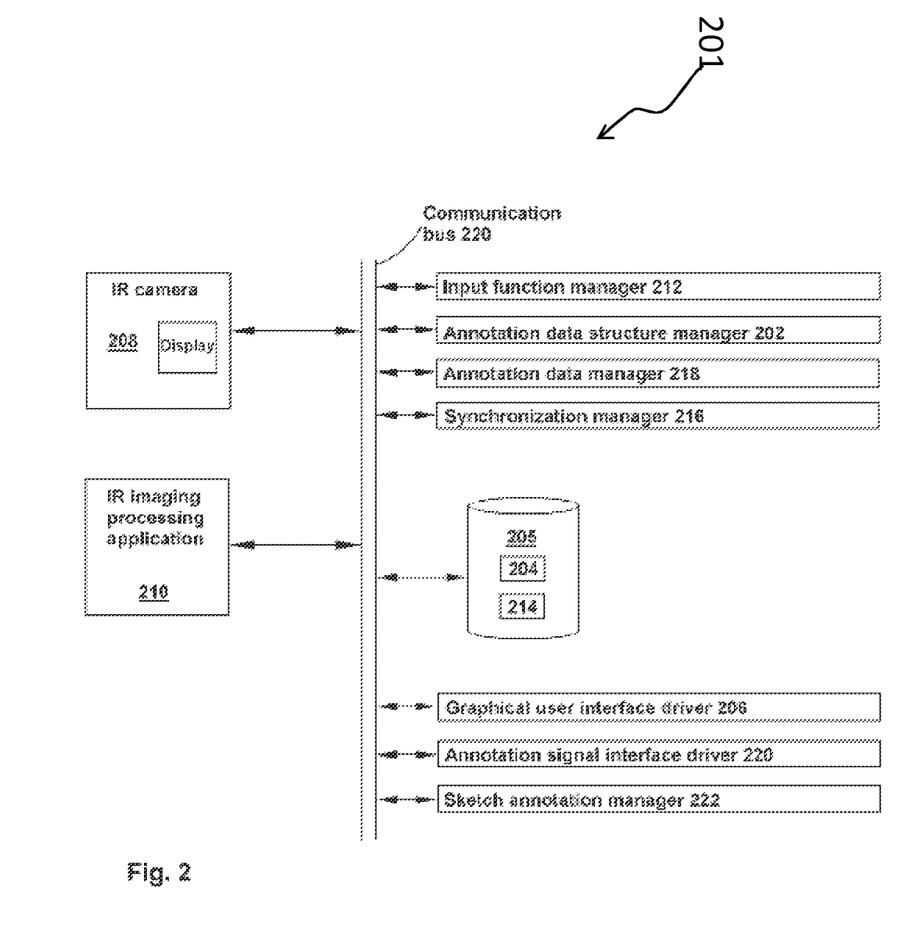
FIG. 2 shows a schematic block diagram of an embodiment of an annotation functionality system.

FIG. 2 shows schematically the architecture of an annotation functionality system 201 according to an embodiment of the disclosure. The annotation functionality system 201 typically comprises computer program code configured to interact with a data processing system of an IR camera 208 or of a general or specific purpose computer 210 provided with an IR image processing application. The annotation functionality system may be comprised in, integrated with or couplable to such an IR image processing application.

As shown in FIG. 2, the annotation functionality system 201 comprises a selection of an annotation data structure manager 202, an input function manager 212, an annotation data manager 218, a sketch annotation manager 222, a user interface driver 206, an annotation signal input driver 220 and a synchronization manager 216, said functional units being communicatively coupled as illustrated in FIG. 2 by schematic communication lines. Such an annotation functionality system is, in different embodiments, adapted to be implemented in or communicatively coupled to an IR camera 208 or an IR image processing application 210. The communicative coupling between the different units is in FIG. 2 schematically illustrated by a communication bus 220 configured to carry data, signals, parameters, control signals, control commands, sensor signal etc. and to which communication bus the different functional units are connected. In different embodiments, the communication is implemented by program calls, parameter variables and signal interfaces, and other suitable manners as would be understood by one skilled in the art.

Annotation Data Structure Manager

An annotation data structure manager 202 configured to manage user controlled definitions of annotation data structures is thus comprised in one embodiment of the annotation functionality system 201 and is communicatively coupled to all or a selection of the other units of the annotation functionality system. The functions configured in the annotations data structure manager comprises a selection of: managing storage and usage of predefined annotation data structures as well as user defined annotation data structures, activating annotation data structures from a library 204 of such structures, creating and defining new annotation data structures, changing or editing existing predefined or previously user defined annotation data structures, or adding or deleting predefined or new created annotation data structures.

An annotations data structure library 204 is thus a storage structure 205, for example a database adapted for storing a collection of annotation data structures and possibly predefined or user defined templates for annotation data structures, and is comprised in or communicatively coupled to the annotations data structure manager 202.

An annotation data structure typically comprises an annotation value field for storage of information or data, an annotation field name descriptive of the annotation and optionally an annotation type definition. An annotation data structure may comprise a main structure and possibly associated sub-structures. Examples of annotation data structures comprise structures configured for text based annotations or for parameter values of different kinds.

So, for example an embodiment of the annotation data structure manager enables that a user in interaction with an IR camera changes or creates an annotation data structure, e.g. by expanding, changing or deleting an input field in an annotation data structure template that is used for text input, duplicating or creating new templates. This may be enabled to perform during the annotation input process, wherein naming and the like are operated by the aid of a display keyboard function.

Annotation Input Function Manager

An annotation input function manager 212 is thus comprised in one embodiment of the annotation functionality system 201 and is communicatively coupled to all or a selection of the other units of the annotation functionality system and to the annotations data structure library 204. The input function manager 212 is adapted to manage input functions for handling input of annotations of different kinds into annotation data structures, for example input functions realizing for example text input fields, calculator programs or statistical calculation programs useful and adapted for handling data from measurements by IR camera devices. According to embodiments, the input functions support input fields that are dynamic and changeable by the user. Embodiments of input functions realize input fields that may use accumulated information from stored data and in an intelligent manner according to a predetermined scheme of rules. Such input functions are displayed to the user on a graphical user interface by means of the user interface driver and are actuatable by activating similarly displayed control command activators such as icons or the like in an appropriate manner.

The annotation input function manager 212 may accumulate information and store data for use as preset or suggested annotation values in an intelligent manner according to a predetermined scheme of rules.

Figure 1:
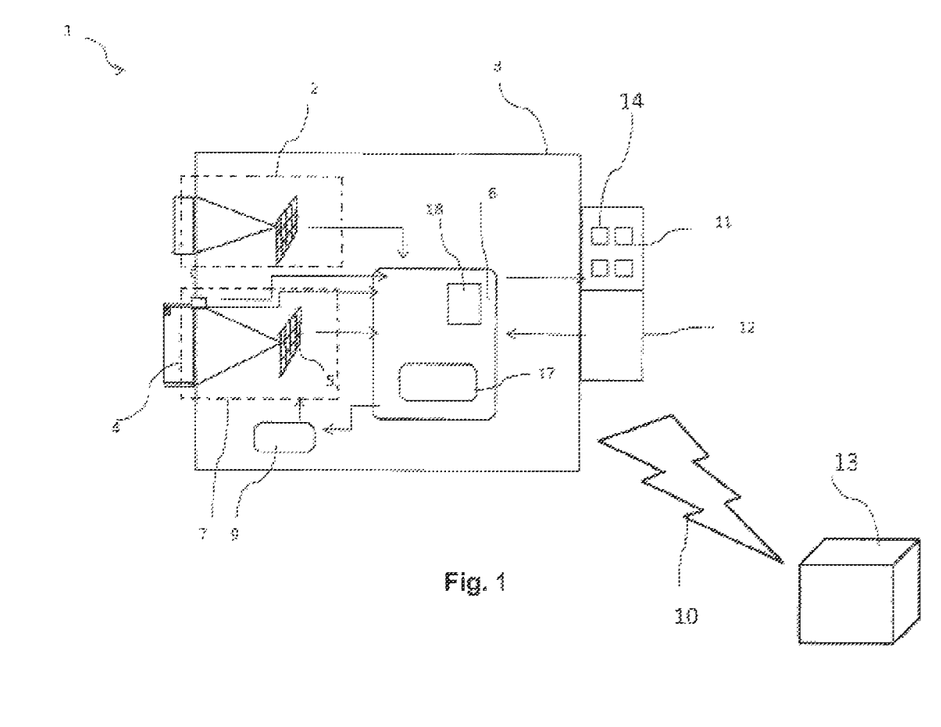
FIG. 1 shows schematically an embodiment of an IR camera in communication with computer.

In one embodiment, said information may be accumulated and stored upon capturing of image data by the IR camera (e.g., an IR camera 1 of FIG. 1), by input from said an annotation signal input driver 220 or user input from an input control unit (e.g., an input control unit 12 of FIG. 1). Examples of said information may be a visual camera image, an IR image, an audio recording, a video recording, temperature, distance to an observed object, moist, resistance, velocity, light intensity, location from a positioning system, text input or time data or other clock related functions.

In one embodiment, said predetermined rules may comprise statistically analyzed previous user input information, such as most frequently used information in stored data, most recently used information in stored data, most likely match of a partial information input to stored data or text completion.

In one embodiment, said predetermined rules may comprise order analyzed stored data such as ordered in alphabetical order, ordered in numeral order or ordered in random order. Said predetermined rules may comprise stored data associated to the IR cameras location. The location may be determined by the use of a positioning system such as Global Positioning System (GPS), by use of Radio-frequency identification (RFID) tag scanning associated to an object or by the use of barcode scanning associated to an object as would be understood by a person skilled in the art.

In one embodiment, said predetermined rules may comprise stored data associated to an observed object by the use of object recognition based on image processing of a captured image such as edge detection, Divide-and-Conquer search, Greyscale matching, Gradient matching, Histograms of receptive field responses or Modelbases as would be understood by a person skilled in the art.

In one embodiment, said predetermined rules may comprise stored data associated to a specific type of measurement such as general, large temperature span or small temperature span.

In one embodiment, said predetermined rules may comprise stored data associated to the measurement application such as monitoring machinery, monitoring electrical installations or monitoring food handling facilities.

In one embodiment, said predetermined rules may comprise stored data associated to an error or phenomenon detected by the IR camera such as hot spot identification, cold spot identification, mold, moisture, draft or building energy leaks due to insufficient insulation.

In various embodiments, said predetermined rules may be used independently or in any combination for use as preset or suggested annotation values.

The input function manager is configured to manage a selection of operations regarding input functions, for example activating, creating, adding, deleting and changing input functions in response to a control command input by a user. Such operations are supported to be performed in real time during for example operation of an IR camera or during operation of an IR image processing application.

The user can thereby customize the presented input interface and can choose which annotation data structures or functions for example in the form of programs that should be presented on the display. For example a calculator can be added as a function in the camera and annotation data can be recalculated upon entering or whenever needed. In this way, certain parameter data does not need to be transferred or stored before recalculation of data, and instead it can be recalculated to a relevant annotation data value directly at the instant of entering for annotation. This minimizes the risk for miscalculation and it enables the user to use for example the camera values in the calculations.

An embodiment of the annotation input function is configured with a sketch annotation function configured to enable free hand sketching or predetermined form sketching by means of an input device operable with the display. For example, the input device may be operable by a finger or a stylus or pointer device to produce a free hand sketch directly on an IR image or on a combined image presented on the display. In one embodiment, this function is enabled by a sketch annotation manager 222 configured to control these functions in conjunction with a selection of the other functional units of the annotations functionality system 201. When the input device is moved over the display, a data set representing pixels marked during the movement and representing a sketch is stored as an annotation and the corresponding pixels are marked with a selected or predetermined color to visualize the sketch. When operating the sketch annotation function a sketch annotation is generated and stored in a suitably adapted annotation data structure.

Creating Templates

Data stored in the course of IR imaging or IR image processing may be used to create templates of annotation data structures and/or annotation input functions for future measurements for example at the same site, for the same or a similar object or for the same, a similar or a certain type of measurement application. The annotation data structure manager 202 and the annotation input function manager 212, respectively, are in embodiments configured for the creation and handling of such templates.

Similarly such stored data, or certain fields or group of fields of the stored data, can be used for automatic presetting of default fields in added input fields, input functions or annotation data structures which can be used in future measurements.

Annotation Data Manager

An annotation data manager 218 is thus comprised in one embodiment of the annotation functionality system 201 and is communicatively coupled to all or a selection of the other units of the annotation functionality system 201. The annotation data manager 218 is configured to manage annotation data for example with respect to storing, transferring, re-using or processing annotation data that has been manually, semi-automatically or automatically entered.

In different embodiments, annotation data, annotation data structure definitions and templates, input function definitions and templates and such information are stored in a storage structure such as a database 205. In other embodiment such information is stored as additional data associated with or integrated with a storable or streamable IR image file format.

In one embodiment, all or a selection of entered annotation data values and annotation data structure definitions such as definitions for input fields are automatically stored in order to be available for future use, without any specific control command from the user.

In one embodiment, the annotation data manager and/or the annotation data structure is configured to provide selectability for automatic fill (autofill) or entering of annotation data values, for example the same value as last entered annotation data value. This is for example realized by locking specific selected field or groups of fields for autofill.

Further, previously entered text values may be assorted according to predetermined rules or criteria and presented in connection with input, for example in the order of most frequently used, alphabetic order, last used etc.

Synchronization Manager

A synchronization manager 216 is thus comprised in one embodiment of the annotation functionality system 201 and is communicatively coupled to all or a selection of the other units of the annotation functionality system 201. The synchronization manager 216 is configured to synchronize information that is stored in or by means of a first and a second annotation functionality system. This feature is configured to support seamless connection between two annotation functionality systems and/or to support seamless synchronization of annotation data structures or annotation input functions between such systems. For example, referring also to FIG. 1, a synchronization manager in an IR camera 1 is seamlessly connected to a similar functionality in a computer 13 running an IR image processing application (e.g., IR image processing application 210). Thus, information for example in the form annotations, new or changed annotation data structures and/or annotation input functions that have been added to the camera 1 are automatically transferred to the other computer preferably in real time so that the latest information or data always is present in both devices. In one embodiment, a first and a second annotation functionality system may be associated for example by means of unique identifiers and preset to synchronize.

An embodiment of the synchronization functionality is configured such that it detects changes and automatically starts a transfer of data (synchronization of data) when any new input data, new application functions, new template or other information is saved on either the computer that runs the IR image processing application (the program that is associated and set in connection with the IR camera) or on the IR camera. The automatic transfer of data between the computer and the IR camera in either direction results in that the most recent data, for example annotation data structures or input function structures or associated data, always is present on both places, which facilitates for the user. The communication between the IR camera and the computer may be performed by wireless communication or by cable.

Thus, in an embodiment setup, all data entered into the camera or into the computer is automatically transferred seamlessly and according to predetermined rules such that the user does not have to interact with the devices to perform the transfer. This is preferably devised as a loopback system, so that the most recent data always are present both in the computer and in the camera. The synchronization may also be triggered or controlled by control commands activated by a user. By the use of the synchronization manager 216, an incremental buildup of saved data can be obtained by input interchangeably in said IR camera 1 and said computer 13.

User Interface Driver

An embodiment of the annotation functionality system 201 thus further comprises a user interface driver 206 that is communicatively coupled to all or a selection of the other units of the annotation functionality system. The user interface driver 206 is configured to present a user input/output interface, preferably a graphical user interface, on a display of an IR camera 208 or in an IR image processing application 210 running on a general or specific purpose computer. The user interface is configured to present text information such as selection menus and input fields, as well as to receive control commands from the user for controlling the entering of annotations, for controlling annotation functions supported by the annotations data structure manager 202 and for controlling input functions supported by the input function manager 212.

Such a graphical interface or graphic display is for example designed in a way so that the user of the IR camera 208 or the IR image processing application 210 can easily add or remove or change functions in real time, for example using touch screen and or buttons on the camera. The interface would typically comprise virtual buttons or thumbnails, showing the different functions on the display of the IR camera 208 or IR image processing application 210, which for example may be positioned on the display such that they become visible in the order of frequency of use for the typical user. In another embodiment the virtual buttons become visible depending on the order of frequency of the latest user of the IR camera 208 or the IR image processing application 210.

Annotation Signal Input Driver

An annotation signal input driver 220 is thus comprised in one embodiment of the annotation functionality system 201 and is communicatively coupled to all or a selection of the other units of the annotation functionality system 201. The annotation signal input driver 220 is configured to receive signals from a selection of functions and being capable of producing a signal. Such functions may be provided in the IR camera 208 or in the IR image processing application 210, for example from sensors such as temperature, moist, resistance, velocity or light intensity sensors, or from positioning systems or clock functions. The annotation signal input driver 220 is further configured to generate an annotation based on or dependent on such a received signal and enter the annotation into a suitable annotation data structure.

Intelligent Data Handling and Flexible Functions

The annotation functionality system 201 enables a user to change the setup of the functions of the IR camera 208 in real time, when the user feels the need. This includes adding and removing functions or substructures of annotation data structures, input functions, data or information associated to a captured IR image for example by dynamically generating a data structures for additional data in dependence of activating a data input field or some other kind of data input structure.

The system comprising, for example, functions for adapting annotation by text input is valuable for the typical user of an IR camera device. For example, the user does not have to prepare information for the input fields in advance, the user can, using various embodiments of the system, activate, build, prepare and add or remove input fields or input structures and corresponding annotation data structures at the time when they are needed. Old input fields can also be copied and reused in the same or in a modified way by the user.

A typical annotation input field in an IR camera is used for storage of data of different types. During an inspection or other measurement situation, the user is helped by having intelligently preset default input fields that is provided in one embodiment and managed by the annotation data structure manager 202 and/or the input function manager 212. In another embodiment, intelligent handling of pre-entered annotation data values, such as for example calibration data, deviation data, data from used standards, typical comments in certain measurement situations, etc., may be provided. An embodiment of the present invention is configured to enable the user to choose which annotation data to reuse and which data that will be preset in the input fields in the IR camera. Such previously entered annotation data is managed by the annotation data manager 218 and stored in a data collection for example in a database 205.

In one embodiment of the invention, the IR camera itself can give suggestions of which input data that may be of interest to preset for the user, for example depending on the site where the camera is used or depending on which object (the object may automatically be recognized by the camera), the type of measurement or application, for example the user may want to use a specific preset input data field each time the user makes a special type of measurement with the camera. The IR camera gives intelligent suggestions relying on for example saved data in the camera from earlier measures by the user. In this way the user can collect know-how in the camera system which uses the stored data and facilitates for the user to reuse old data information in a time efficient way. Also, data which is manually added to the computer station can be transferred to the camera and reused as preset default data by various embodiments of the present invention.

Further, the invention allows to link subsets of information against an underlying data model, allowing a clever interpretation or organization and reuse of input data. For example, you can know which subset of data that the user connects to a specific place, object application type, etc.

The user is for example also able to manually use classes for the stored data information; the classing may be regarding the site, object or location etc. This manually classed information can then be reused in an advanced way, for example when the user makes a revisit in the same site, the camera will notice and suggest for a certain amount of preset default data, or suggest for a certain preset default text which was used by the user during the last visit on that site. The present invention enables in this way intelligent reuse of stored information. This saves a lot of time for the user.

In certain situations, for example, the site, location and object are the same but still a lot of preset default information that may facilitate for the user is depending on which type of error or phenomenon that the IR measurement seeks to detect. Different types of phenomena in a house may for example be mold, moisture, draft, isolation, lack of isolation etc. The present invention let the user enter, in a simple manner, into the camera which type of phenomenon that is of interest to measure and by doing this, get the relevant preset default information in the camera. The site and object text input fields are kept but the type of phenomenon can still be changed without for example changing site and object.

For example a specific type of phenomenon may have a certain predetermined template, which can be based on former data or on information determined by the user. The template for a specific type of phenomenon may allow for a group of input fields while another template, allowing other input fields is used for another type of phenomenon.

The stored data can also be sorted by the user depending on type of phenomenon, object, site, etc. The sorting can be performed in the IR camera display or on the computer. In this way old data can easily be accessed by the user.

In certain situations the user may have a need to lock and reuse certain input data. This is possible using various embodiments of the present invention. In one embodiment of the invention, the user may lock certain fields or group of fields in the data and use the data in the next measurement. This may be valuable for example during thermographic inspections.

In one embodiment, the annotation data manager 218 is configured to visualize previously entered data for information or for possible selection options, in response to activation of certain annotation data structure templates or input functions where the data may fit in or be appropriate to enter based on predetermined rules.

Information Model

In an embodiment, the above data handling functions are supported by coupling sets or subsets of a data collection to a predefined information model according to predetermined rules. Such an information model may be configured to enable interpretation and/or organization and/or re-use of data. For example, predetermined rules may comprise rules for determining what subset of data is coupled to, for example, a certain location, object, site, application type by a user.

The information model may further be used to couple collected data to a specific node or heading in the information model, and group and visualize or present the user defined input fields according to this header. In this connection there may be a distinction made dependent on whether the annotation data is coupled to site, location, object etc. This enables the user to define input field according to personal needs, to organize, visualize and search data as well as presenting this information for example as a reference or route overview for example to be used when repeating an inspection route.

The annotation data structure templates and/or the input function templates may also be defined and grouped dependent on specific applications or identified measurement deviation types.

Embodiment of IR Camera Implementing the Inventive Concept

FIG. 1 shows an example of an IR camera implementing an embodiment of the invention. FIG. 1 shows a schematic view of an IR camera 1 comprising a housing 3, an IR objective 4, an imaging capturing device 5, an IR image focusing mechanism 7, a visual camera 2 and a processing unit 6. The processing unit 6 is devised to process infrared image data captured by the image capturing device 5. The processing unit 6 comprises in one embodiment an FPGA (Field-Programmable Gate Array) 17 for processing the captured image and a general CPU 18 for controlling various functions in the camera, for example data management, image handling, data communication and user interface functions. The processing unit 6 is usually coupled to or comprises a volatile buffering memory, typically a RAM (Random Access Memory) adapted for temporarily storing data in the course of processing. The processing unit 6 is further devised to transfer data from the IR camera 1 via wireless communication 10 to another unit, for example a computer 13. The processing unit 6 is also responsible for receiving data from an input control unit 12. The input control unit 12 is coupled to input of the processing unit 6 and devised to receive and transmit input control data, for example commands or parameters data to the processing unit 6.

An instance of the annotation functionality system 201 is in this embodiment realized by means of computer program code portions that is executed on the processing unit 6 of the camera 1 and/or on a processing unit of the computer 13.

Further the camera 1 comprises a display 11 which shows virtual buttons or thumbnails 14 presented as a graphical user interface on a display. The virtual buttons or thumbnails 14, showing the different functions on the display 11 of the IR camera 1 may for example be positioned on the display such that they become visible in the order of frequency of use for the typical user. The computer 13 would similarly comprise a display as would be understood by a person skilled in the art.

Further Embodiments

According to an embodiment there is provided a computer system having a processor being adapted to perform any of the operations or functions of the embodiments presented above.

According to an embodiment of the invention, there is provided a computer-readable medium on which is stored non-transitory information for performing a method according to any of the embodiments presented above.

According to further embodiments, there is provided computer-readable mediums on which is stored non-transitory information for performing any of the method embodiments described above.

According to an embodiment there is provided a computer program product comprising code portions adapted to control a processor to perform any of the operations or functions of any of the method embodiments described above.

According to an embodiment there is provided a computer program product comprising configuration data adapted to configure a field-programmable gate array (FPGA) to perform any of the operations or functions of any of the method embodiments described above.

According to an embodiment, the user can save image data and/or image-associated data and/or annotation structure associated data obtained by various operations of the methods described above to a memory for processing, or transfer to another processing unit for further analysis, management, processing and/or storage.

In an alternative embodiment, disclosed methods can be implemented by a computing device, such as a PC, handheld device, PDA, etc., that may encompass the functions of an FPGA-unit or a general data processor specially adapted for performing operations of a method embodiment of the present invention. The computing device may comprise a memory and/or a display unit.

Use Case Embodiments

Figure 3A:
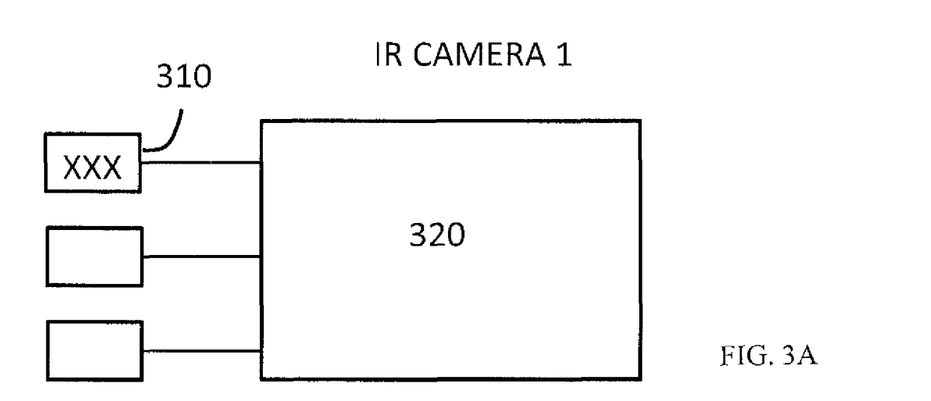
FIGS. 3A-3C show how an annotation input function manager may accumulate information and store data for use as preset or suggested annotation values in an intelligent manner according to a predetermined scheme of rules, in accordance with an embodiment of the disclosure.
Figure 3B:
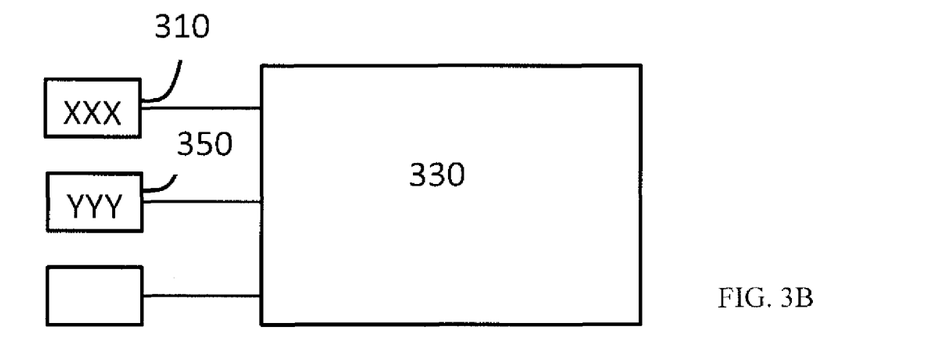
Figure 3C:
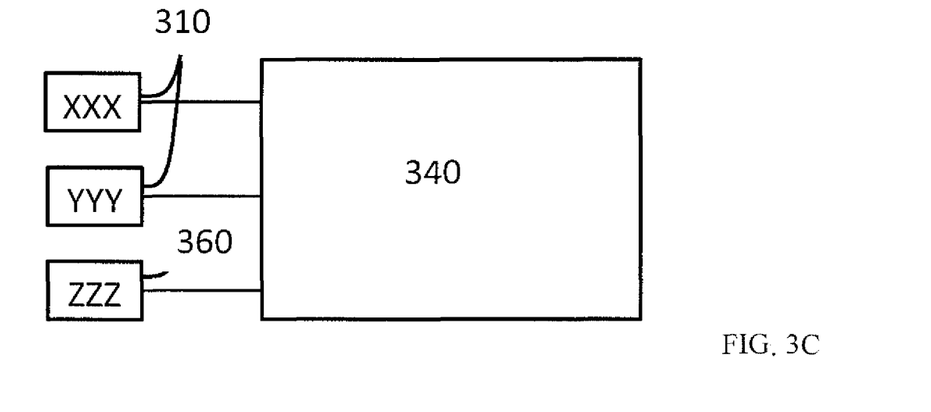

An example method of use according to an embodiment of the disclosure is shown in FIGS. 3A-3C, where the annotation input function manager 212 may accumulate information and store data for use as preset or suggested annotation values in an intelligent manner according to a predetermined scheme of rules. Upon capturing IR images, annotation values are accumulated and stored at three different time instances, thereby achieving incremental acquisition of annotation values.

In one example, a first IR image 320 may be captured and a first annotation value may be accumulated and stored at a first time instance at a first location, as shown in FIG. 3A. At a second time instance, a second image 330 is captured at said first location, predetermined rules associates said first location to stored data, which is used to obtain preset or suggested annotation values 310, and an additional annotation value 350 is accumulated and stored, as shown in FIG. 3B. At a third time instance, a third image 340 is captured at said first location, predetermined rules associates said first location to stored data, which is used to obtain preset or suggested annotation values 310, and an additional annotation value 360 is accumulated and stored, as shown in FIG. 3C.

In yet another example, a first IR image 320 may be captured and a first annotation value may be accumulated and stored at a first time instance at a first location. At a second time instance, said first image is retrieved from memory, predetermined rules associate said first image with stored data, which is used to obtain preset or suggested annotation values 310, and an additional annotation value 350 is accumulated and stored. At a third time instance, a first image is retrieved from memory, predetermined rules associate said first image with stored data, which is used to obtain preset or suggested annotation values 310, and an additional annotation value 360 is accumulated and stored.

Figure 4:
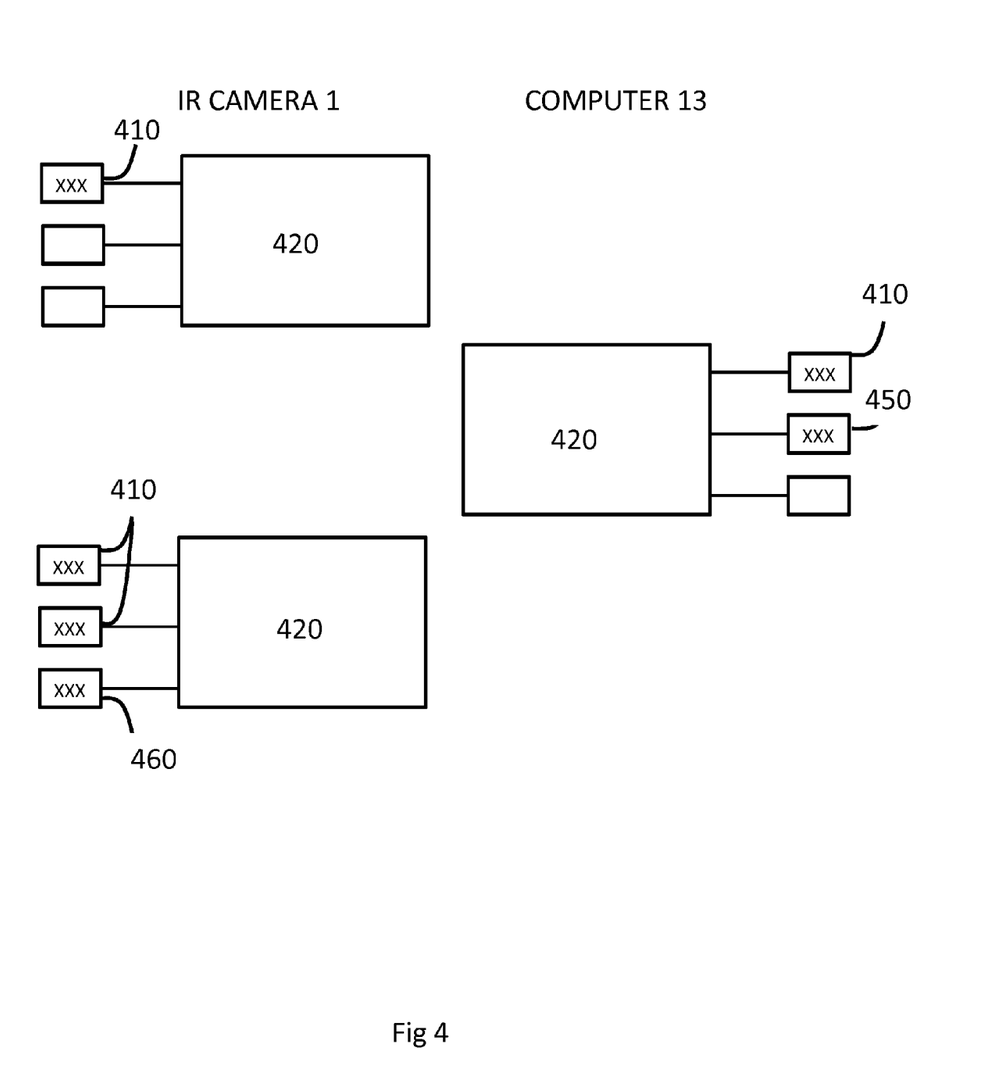
FIG. 4 shows how an annotation input function manager may accumulate information and store data for use as preset or suggested annotation values in an intelligent manner according to a predetermined scheme of rules, and how a synchronization manager synchronizes information that is stored in or by means of a first and a second annotation functionality system, in accordance with an embodiment of the disclosure.

Another example method of use according to an embodiment of the disclosure is shown in FIG. 4, where the annotation input function manager 212 may accumulate information and store data for use as preset or suggested annotation values in an intelligent manner according to a predetermined scheme of rules and the synchronization manager 216 synchronizes information that is stored in or by means of a first and a second annotation functionality system. The synchronization manager 216 supports seamless connection between two annotation functionality systems and/or to support seamless synchronization of annotation data structures or annotation input functions between such systems. For example, the synchronization manager 216 in the IR camera 1 is seamlessly connected to a similar functionality in the computer 13, running the IR image processing application 210. Thus, information for example in the form of annotations, new or changed annotation data structures and/or annotation input functions that have been added to the IR camera 1 are automatically transferred to the other computer, or vice versa, so that the latest information or data always is present in both devices.

Annotation values may be accumulated and stored at three different time instances thereby achieving incremental acquisition of annotation values through synchronization between said IR camera 1 and said computer 13.

In one example, a first IR image 420 may be captured and a first annotation value may be accumulated and stored at a first time instance at said IR camera 1. At a second time instance, said IR camera 1 and computer 13 are synchronized, predetermined rules associate said first image with stored data, which is used to obtain preset or suggested annotation values 410, and an additional annotation value 450 is accumulated and stored at said computer 13. At a third time instance, said IR camera 1 and computer 13 are synchronized, predetermined rules associate said first image with stored data, which is used to obtain preset or suggested annotation values 410, and an additional annotation value 460 is accumulated and stored at said IR camera 1.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system for managing annotations to IR images, the IR image annotation system comprising a processor configured to provide selectable annotation input functions that are actuatable using control commands displayed on the display,
    wherein a first instance of the IR image annotation system is synchronized with a second instance of the IR image annotation system;
    wherein entered annotation information or data is transferred between said instances and stored in respective instances;
    wherein the transfer of data between said instances of the IR image annotation system is performed in either direction;
    wherein the first instance of the IR image annotation system is an IR camera;
    wherein the annotation input functions are configured to be activated, added or changed in real time in response to a control command from a user;
    wherein the processor is configured to provide a synchronization functionality that detects changes and starts synchronizing data when any new input data, new application functions, new template or other information is saved on either the first instance of the IR image annotation system or on the second instance of the IR image annotation system;
    wherein the annotation input functions comprise input fields that use accumulated information from stored data according to predetermined rules; and
    wherein the predetermined rules comprise one or more of: most frequently used information, most recently used information, most likely match of a partial information input, alphabetical ordering, numerical ordering, an association with a location of the IR camera, an association with an object recognized by imaging processing of a captured image, an association with a type of measurement, an association with a measurement application, and/or an association with an error or phenomenon detected by the IR camera.

2. The IR image annotation system of claim 1, wherein the second instance of the IR image annotation system is a computer.

3. The IR image annotation system of claim 1, wherein the annotation input functions comprise a sketch annotation function configured to generate a sketch annotation dependent on a sketch marked on an IR image and input on a display using a sketch input device.

4. The IR image annotation system of claim 1, wherein the annotation input functions comprise an annotations data structure configured for annotations in the form of a selection of text input fields, calculator programs or statistical calculation programs useful for handling IR image data.

5. The IR image annotation system of claim 4, wherein the annotation data structure and/or the annotation input functions are changeable by a user.

6. The IR image annotation system of claims 1, wherein templates for the annotation data structure and/or templates for the annotation input functions are creatable, and wherein said templates for the annotation input functions are created using a collection of annotation data structures or predefined or user defined templates for annotation.

7. The IR image annotation system of claim 1, wherein the accumulated information from the stored data is used for an automatic preset or suggested annotation value.

8. A method for managing annotations to IR images in an IR image annotation system comprising a first instance of the IR image annotation system and a second instance of the IR image annotation system, the method comprising:
    receiving control commands indicating a selection of annotation input functions;
    selecting annotation input functions based on the received control commands;
    synchronizing the first instance of the IR image annotation system with the second instance of the IR image annotation system by transferring entered annotation information or data is between said instances,
    wherein the transfer of data between said instances of the IR image annotation system is performed in either direction,
    wherein the first instance of the IR image annotation system is an IR camera,
    wherein the annotation input functions are configured to be activated, added or changed in real time in response to a control command from a user,
    wherein the synchronizing of the first and the second instances comprises detecting changes and starting synchronizing data when any new input data, new application functions, new template or other information is saved on either the first instance of the IR image annotation system or on the second instance of the IR image annotation system,
    wherein the annotation input functions comprise input fields that use accumulated information from stored data according to predetermined rules, and
    wherein the predetermined rules comprise one or more of: most frequently used information, most recently used information, most likely match of a partial information input, alphabetical ordering, numerical ordering, an association with a location of the IR camera, an association with an object recognized by imaging processing of a captured image, an association with a type of measurement, an association with a measurement application, and/or an association with an error or phenomenon detected by the IR camera; and storing the transferred annotation information or data in respective instances, such that the most recent information is present in the first instance of the IR image annotation system and in the second instance of the IR image annotation system.

9. The method of claim 8, further comprising performing the systems functions as defined in the system of claim 1.

10. A non-transitory machine-readable medium storing computer program product for managing annotations to IR images, the computer program product comprising code portions adapted to cause a processor to perform systems functions defined for the system of claim 1.

11. An IR image annotation system for managing annotations to IR images, the IR image annotation system comprising a processor configured to provide text input functions that can be activated, added, or changed in real time using control commands displayed on the display, wherein the processor is configured to provide a synchronization functionality that detects changes and starts synchronizing data between a first instance of the IR image annotation system and a second instance of the IR imaging annotation system when new input data, new application functions, new template or other information is saved on either the first instance of the IR image annotation system or on the second instance of the IR image annotation system;

wherein the synchronizing of data comprises transferring entered annotation information or data between said instances and storing the transferred annotation information or data in respective instances;

wherein the transferring of annotation information or data between said instances of the IR image annotation system is performed in either direction;

wherein the text input functions comprise input fields that use accumulated information from stored data according to predetermined rules; and wherein the predetermined rules comprise one or more of: most frequently used information, most recently used information, most likely match of a partial information input, alphabetical ordering, numerical ordering, an association with a location of an IR camera, an association with an object recognized by imaging processing of a captured image, an association with a type of measurement, an association with a measurement application, and/or an association with an error or phenomenon detected by the IR camera.

\* \* \* \* \*